(12) United States Patent
Bogacz et al.

(10) Patent No.: US 11,302,070 B1
(45) Date of Patent: Apr. 12, 2022

(54) SYSTEMS AND METHODS FOR MULTI-TREE DECONSTRUCTION AND PROCESSING OF POINT CLOUDS

(71) Applicant: Illuscio, Inc., Culver City, CA (US)

(72) Inventors: Joseph Bogacz, Perth (CA); Robert Monaghan, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/551,397

(22) Filed: Dec. 15, 2021

Related U.S. Application Data

(63) Continuation of application No. 17/485,922, filed on Sep. 27, 2021, now Pat. No. 11,227,432.

(51) Int. Cl.
*G06T 1/60* (2006.01)
*G06T 17/00* (2006.01)

(52) U.S. Cl.
CPC .............. *G06T 17/005* (2013.01); *G06T 1/60* (2013.01)

(58) Field of Classification Search
CPC ................................. G06T 1/60; G06T 17/005
USPC ........................................................ 345/420
See application file for complete search history.

(56) References Cited

U.S. PATENT DOCUMENTS

| | | |
|---|---|---|
| 6,222,557 B1 | 4/2001 | Pulley, IV et al. |
| 6,313,838 B1 | 11/2001 | Deering |
| 9,600,929 B1 | 3/2017 | Young et al. |
| 10,861,175 B1 | 12/2020 | Monaghan et al. |
| 2007/0097120 A1 | 5/2007 | Wheeler et al. |
| 2009/0100366 A1 | 4/2009 | Fitzmaurice et al. |
| 2010/0085353 A1* | 4/2010 | Zhou ....................... G06T 17/00 345/419 |
| 2014/0044343 A1 | 2/2014 | Bell et al. |
| 2014/0198097 A1 | 7/2014 | Evans |
| 2018/0143023 A1 | 5/2018 | Bjorke et al. |
| 2018/0144547 A1 | 5/2018 | Shakib et al. |
| 2018/0350044 A1 | 12/2018 | Ponto et al. |

OTHER PUBLICATIONS

Rico Richter, Soren Discher, Jurqen Dollner, "Out-of-Core Visualization of Classified 3D Point Clouds", 2015, Springer, 3D Geoinformation Science, Lecture Notes in Geoinformation and Cartography, pp. 227-242.

(Continued)

*Primary Examiner* — Jacinta M Crawford
(74) *Attorney, Agent, or Firm* — Ansari Katiraei LLP; Arman Katiraei; Sadiq Ansari (57) ABSTRACT

Disclosed is a system for efficiently accessing a point cloud via a multi-tree deconstruction of the point cloud. The system may receive the point cloud, may differentiate different sets of data points from the point cloud using differentiation criteria, and may generate different trees with each tree having leaf nodes corresponding to one of the differentiated sets of data points and parent nodes defined according to commonality in values of two or more leaf nodes. The system may receive a request to render the 3D environment, load a first tree into memory, generate a first image from the first tree data points, flush the first tree from the memory, load a second tree into memory, generate a second image from the second tree data points, and present a composite image by combining at least the first image with the second image.

20 Claims, 8 Drawing Sheets

(56) References Cited

OTHER PUBLICATIONS

Rico Richter, Jurqen Dollner, "Out-of-Core Real-Time Visualization of Massive 3D Point Clouds", Jun. 23, 2010, ACM, AFRIGRAPH '10: Proceedings of the 7th International Conference on Computer Graphics, Virtual Reality, Visualisation and Interaction in Africa, pp. 121-128.

Enrico Gobbetti, Fabio Marton, "Layered point clouds: a simple and efficient multiresolution structure for distributing and rendering gigantic point-sampled models", 2004, Elsevier, Computers & Graphics 28 (2004) 815-826.

Jiann-Yeou Rau, Jyun-Ping Jhan, Ya-Ching Hsu, "Analysis of Oblique Aerial Images for Land Cover and Point Cloud Classification in an Urban Environment", Mar. 2015, IEEE, IEEE Transactions on Geoscience and Remote Sensing, vol. 53, No. 3, pp. 1304-1319.

Thomas A. Funkhouser, Carlo H. Sequin, "Adaptive Display Algorithm for Interactive Frame Rates During Visualization of Complex Virtual Environments", Sep. 1993, ACM, SIGGRAPH '93: Proceedings of the 20th Annual Conference on Computer Graphics and Interactive Techniques, pp. 247-254.

\* cited by examiner

SYSTEMS AND METHODS FOR MULTI-TREE DECONSTRUCTION AND PROCESSING OF POINT CLOUDS

CLAIM OF BENEFIT TO RELATED APPLICATIONS

This application is a continuation of U.S. nonprovisional application Ser. No. 17/485,922 entitled "Systems and Methods for Multi-Tree Deconstruction and Processing of Point Clouds", filed Sep. 27, 2021. The contents of application Ser. No. 17/485,922 are hereby incorporated by reference.

BACKGROUND

A point cloud may represent a three-dimensional ("3D") object or environment with several data points. Each data point may represent the positioning and other characteristics of an imaged point of the 3D object or environment.

Point clouds may provide a more accurate capture of a 3D object or environment than a digital image or 3D render because of the greater resolution and/or fidelity provided by the point cloud data points relative to pixels of an image or meshes, voxels, and/or other polygons used in a 3D image to represent a region of the 3D object or environment. Specifically, pixels of a digital image lack 3D positional information and are of a fixed resolution that may be orders of magnitude lower than the resolution provided by the point cloud data points.

The greater accuracy of a point cloud comes at the cost of greater computational and resource overhead. For instance, a point cloud may have millions or billions of data points that are loaded into memory and processed together in order to render the 3D environment represented by that point cloud. Any interaction that changes one or more data points may have a cascading impact that may result in reorganizing or otherwise processing a large volume of other data points. In other words, touching one or more of the point cloud data points may require the system to inspect and/or process all or many other point cloud data points in order to ensure that a change is implemented correctly. Accordingly, the sheer volume of data in a point cloud may decrease performance of computers and/or other point cloud devices to unacceptable levels.

DETAILED DESCRIPTION OF PREFERRED EMBODIMENTS

The following detailed description refers to the accompanying drawings. The same reference numbers in different drawings may identify the same or similar elements.

Provided are systems and methods for multi-tree processing of point clouds. The multi-tree processing may efficiently access, render, modify, and/or otherwise process an implicated subset of point cloud data points without having to access or process other subsets of point cloud data points. The multi-tree processing may also serialize and/or parallelize the processing of different sets of data points from the same point cloud based on available resources of the processing system or device.

The multi-tree processing of point clouds may include separating a single point cloud (e.g., a file, an image, a data structure, and/or other container), that represents a three-dimensional ("3D") object or environment using a large number of data points (e.g., millions or billions of data points), into different trees or data structures, and processing one or more of the trees sequentially and/or in parallel depending on the parts of the point cloud that are rendered, manipulated, and/or otherwise interacted with. The partitioning of the point cloud data points into the different trees and the serialized or parallelized processing of the trees may significantly reduce processor, memory, and/or other resource overhead for rendering, manipulating, and/or otherwise visualizing or interacting with the point cloud and different elements therein, and may increase system or device responsiveness when working on the point cloud regardless of the size of the point cloud or the number of data points included in the point cloud.

In some embodiments, a point cloud system ("PCS") may generate different trees for subsequent processing of a particular point cloud based on different elements or objects that the PCS differentiates from the particular point cloud. The PCS may differentiate the elements or objects use one or more differentiation criteria, and may generate a different tree for each differentiated element or object based on the set of data points that forms that differentiated element or object in the particular point cloud.

In some embodiments, the differentiation criteria may specify positional values, positional commonality, visual characteristic values, visual characteristic commonality, and/or other data point value or commonality for differentiating the elements or objects from the particular point cloud. The PCS may inspect the point cloud data points for these values and/or commonality, may differentiate highdetail, high-density, or high-resolution elements or objects from low-detail, low-density, or low-resolution elements or objects based on the values and/or commonality, may differentiate foreground elements or objects from background elements or objects, and/or may differentiation other elements or objects within the particular point cloud. In some embodiments, the PCS may construct the different trees with different sets of point cloud data points based on differentiated values and/or commonality observed in each set of data points and/or the respective positioning and/or visual characteristics of the data points.

Figure 1:
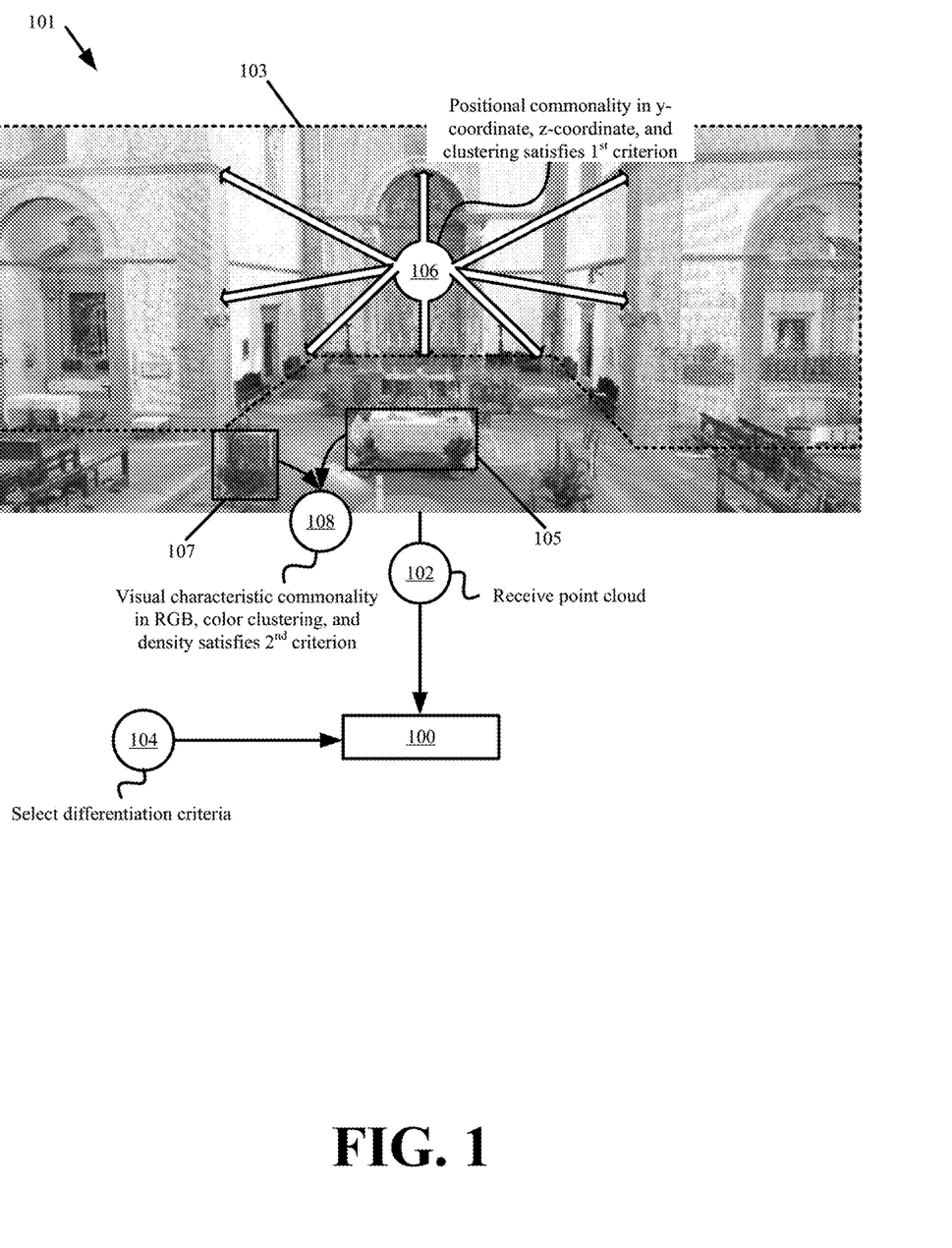
FIG. 1 illustrates an example of differentiating elements from a point cloud using one or more differentiation criteria in accordance with some embodiments presented herein.

FIG. 1 illustrates an example of PCS 100 differentiating elements from point cloud 101 using one or more differentiation criteria in accordance with some embodiments presented herein. PCS 100 may include one or more devices with compute, memory, and/or other resources for rendering, editing, interacting with, and/or other working on different point clouds.

PCS 100 may receive (at 102) point cloud 101. For instance, PCS 100 may open a file that stores the data points, metadata, and/or other data for point cloud 101, or may access an image, a data structure, and/or other container that stores point cloud 101.

Point cloud 101 may include data points that correspond to and capture the positional and non-positional information for different points of a 3D environment that includes multiple objects. Point cloud 101 and the individual data points may be generated by a 3D or depth-sensing camera, Light Detection and Ranging ("LiDAR") sensor, Magnetic Resonance Imaging ("MM") device, Positron Emission Tomography ("PET") scanning device, Computerized Tomography ("CT") scanning device, time-of-flight device, and/or other imaging equipment for 3D objects, volumetric objects, or 3D environments.

The point cloud data points may differ from pixels of a two-dimensional ("2D") image, because certain regions of point cloud 101 may have no data points, lower densities of data points, and/or higher densities of data points based on varying amounts of information that are detected at those regions when imaging a 3D object, volumetric object, or 3D environment. For instance, a point cloud imaging device may capture an object closer to the point cloud imaging device with more data points (e.g., a higher resolution) than if the same object was placed further away from the point cloud imaging device because a greater number of emitted beams (e.g., light, laser, etc.) from the device make contact with the closer object than the farther object and with measurements from each beam resulting in a different data point of point cloud 101. In contrast, pixels of a 2D image have a uniform density and a fixed arrangement defined by the resolution of the 2D image. Moreover, the point cloud data points may have a non-uniform distribution, placement, or positioning, whereas the 2D image has pixel data for each pixel of a defined resolution (e.g., 640×480, 800×600, etc.).

Each point cloud data point may include positional and non-positional data values. The positional data values may include coordinates within 3D space. For instance, each point cloud data point may include x-coordinate, y-coordinate, and z-coordinate data point values for each imaged point, feature, element, object of the 3D environment. The non-positional data point values may include values for descriptive characteristics of the data point. The descriptive characteristics may include the visual characteristics of the imaged point, feature, element, or object. The visual characteristics may correspond to a detected color. The color may be represented using red, green, and blue ("RGB") values. In some embodiments, the descriptive characteristics may include the chrominance and/or luminance of the imaged point, feature, element, or object. In some other embodiments, the descriptive characteristics may include properties of the imaging device used to capture the 3D environment. For instance, the descriptive characteristics may include a Tesla strength value to quantify the strength of the magnetic field that was used in detecting and/or imaging a particular point of the 3D environment. In some embodiments, the descriptive characteristics may include energy, audible or sound, and/or other characteristics of the imaging device or the object being imaged. Accordingly, the non-positional data values may include any property or descriptive characteristic of the imaged object part (e.g., hue, saturation, brightness, reflectivity, etc.) or of the imaging device used to capture the object part at a corresponding data point in 3D space.

The positional and non-positional data values for each particular data point may be stored in an array, and may be associated with that particular data point using some identifier or one or more of the data values. For instance, a point cloud data point may be identified with its x-coordinate, y-coordinate, and z-coordinate data values, and non-positional information, such as the red, green, blue, chrominance, luminance, tesla, and/or other values, for that data point may be accessed via a lookup of the x-coordinate, y-coordinate, and z-coordinate data values.

PCS 100 may select (at 104) differentiation criteria with which to identify and/or extract the sets of data points for different elements or objects that are to be partitioned into different trees. PCS 100 may inspect the data points of point cloud 101 using the selected (at 104) differentiation criteria. The inspection may include identifying different sets that match or satisfy the differentiation criteria.

In some embodiments, the differentiation criteria may include a first criterion for differentiating one or more elements or objects based on positional commonality found in one or more sets of data points. More specifically, the first criterion may specify a range of z-depth positional data values, a range of y-depth positional value, a specific positional clustering (e.g., data points in which the x, y, z positions are separated by less than a threshold distance), a specific resolution for the differentiated elements or objects (e.g., total number of data points within a bounded volume or region of 3D space), and/or other commonality that is determined directly or indirectly from the positional values. As shown in FIG. 1, PCS 100 may use the first criterion to identify walls within the background of point cloud 101, and may determine (at 106) that first set of data points 103 satisfy the first criterion and that first set of data points 103 represent a first differentiated object in point cloud 101 that should be partitioned into a first tree and/or processed separately from other sets of data points.

In some embodiments, the differentiation criteria may include a second criterion for differentiating one or more elements or objects based on non-positional commonality found in one or more sets of data points. More specifically, the second criterion may specify a range of lighting, brightness, and/or coloring values, color clustering in which the color values between neighboring data points does not vary by more than a specified amount, and/or commonality in magnetic properties, reflectivity, density, weight, and/or other non-positional information stored as part of the data points. As shown in FIG. 1, PCS 100 may use the second criterion to identify foreground objects that are of certain interest based on their coloring and/or other non-positional commonality, and may determine (at 108) that second set of data points 105 and third set of data points 107 satisfy the second criterion and should be partitioned into second and third trees for separate processing from other sets of data points. In some embodiments, the remaining data points of point cloud 101 that did not satisfy the differentiation criteria may be grouped together as a set of data points for inclusion in a fourth tree.

In some embodiments, the differentiation criteria may include criterion that is defined based on commonality that spans one or more positional data values and non-positional data values of the data points. For instance, PCS 100 may perform edge detection and object differentiation by detecting data points with positional commonality as well as visual characteristic commonality.

Different differentiation criteria may be defined and/or selected for different point clouds. For instance, PCS 100 may use first differentiation criteria in order to differentiate elements or objects within a point cloud of a landscape, and may use second differentiation criteria in order to differentiate elements or objects within a point cloud capture of architecture.

The objective for using the differentiation criteria is to separate the sets of data points that are most likely to be changed, adjusted, or otherwise interacted with from other data points. Consequently, PCS 100 no longer needs to treat the point cloud as one monolithic data structure in which all data points must be loaded in memory and processed collectively for even the smallest or most isolated of changes. Instead, PCS 100 may perform the element or object differentiation, that is illustrated in FIG. 1, to allow for a piecemeal loading and processing of the point cloud and/or a more efficient usage of resources as unused or unnecessary parts of the point cloud may be omitted from memory and may be excluded from the rendering, manipulation, and/or processing of other parts of the point cloud.

Once PCS 100 has differentiated the sets of data points, PCS 100 may create a tree-based representation for each set of data points. Creating the tree-based representation may include organizing each set of data points within a different binary tree, octree, k-dimensional ("k-d") tree, or other tree-like structure.

In doing so, PCS 100 may partition the point cloud into multiple trees, and PCS 100 may access, manipulate, render, process, and/or otherwise interact with each tree and the organized set of data points of that tree independent of the other trees, sets of data points, and the collective point cloud. In other words, rather than load all the data points of a point cloud into memory at one time and/or process all the data points in order to edit one portion of the point cloud, the different tree-based representations allow PCS 100 to selectively load into memory only the set of data points for the element or object being accessed, processed, manipulated, and/or otherwise interacted with, thereby greatly reducing the resource overhead and computational effort on PCS 100 and/or another device working on that point cloud. Additionally, the tree-based organization allows PCS 100 to quickly and efficiently access different subsets of data points that share specific commonality in the different branches or parent nodes of the tree.

Figure 2:
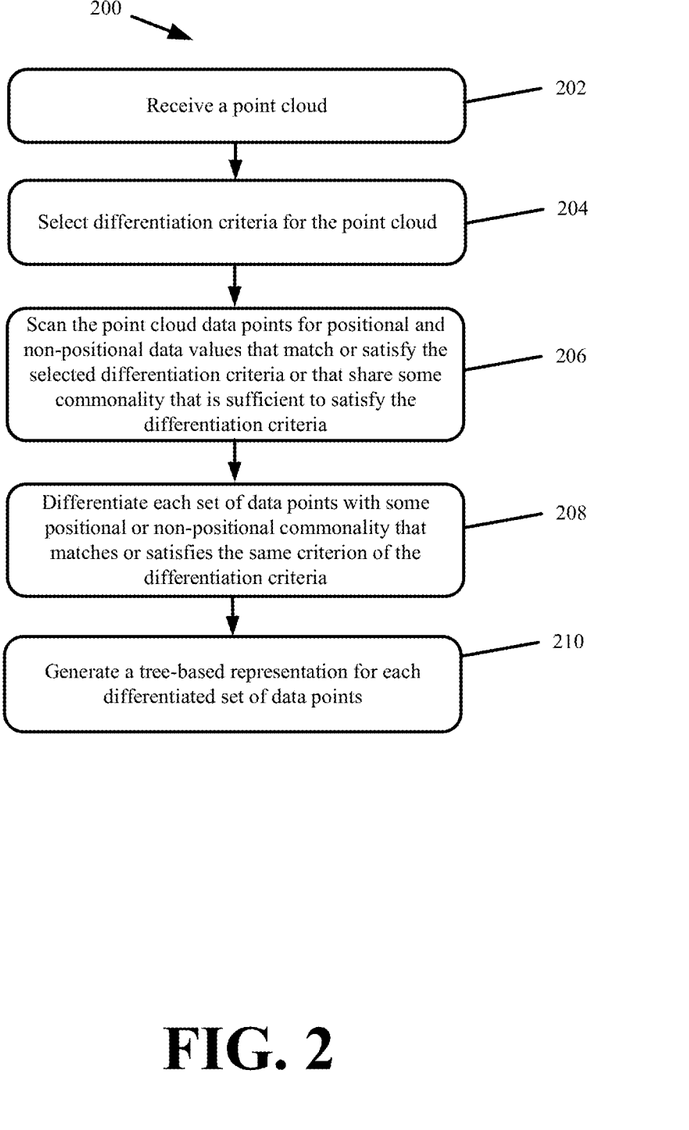
FIG. 2 presents a process for partitioning a point cloud into multiple trees with different sets of data points that are dynamically differentiated based on positional and non-positional commonality detected within each set of data points in accordance with some embodiments presented herein.

FIG. 2 presents a process 200 for partitioning a point cloud into multiple trees with different sets of data points that are dynamically differentiated based on positional and non-positional commonality detected within each set of data points in accordance with some embodiments presented herein. Process 200 may be implemented by PCS 100. In particular, PCS 100 may include one or more devices with processors, non-transitory computer-readable medium, and/or other resources for accessing, rendering, manipulating, and/or otherwise interacting with point clouds and the 3D objects or 3D environments represented by those point clouds.

Process 200 may include receiving (at 202) a point cloud. Receiving (at 202) the point cloud may include receiving a file, image, data structure, and/or other container that contains all the point cloud data points.

Process 200 may include selecting (at 204) differentiation criteria with which to differentiate elements or objects within the point cloud and to identify and partition the sets of data points that form each of the differentiated elements or objects. The differentiation criteria may be defined with ranges, conditions, or sought-after commonality for one or more positional data values and/or non-positional data values of the point cloud data points. For instance, the differentiation criteria may specify differentiating elements or objects in the point cloud based on commonality in their z-depth positions, their total distance from neighboring data points of the same element or object being less than a threshold amount, commonality (e.g., a threshold amount of variance) in the coloring (e.g., RGB values) of neighboring data points (e.g., data points that are up to a maximum distance from one another). Accordingly, the differentiation criteria may include conditional statements, regular expressions, and/or comparative definitions.

In some embodiments, the differentiation criteria may be defined as part of the point cloud file or point cloud metadata. Accordingly, the selection (at 204) may involve reading the point cloud metadata.

In some other embodiments, PCS 100 may dynamically select (at 204) the differentiation criteria using artificial intelligence and/or machine learning. For example, PCS 100 may perform a sample inspection and/or render of the point cloud data points to determine a first set of regions with a higher concentration of data points (e.g., a tighter clustering of data points) than a second set of regions. PCS 100 may use artificial intelligence and/or machine learning to determine the positional and non-positional (e.g., visual characteristic) commonality in one or more of the first and second sets of regions, and to define the differentiation criteria based on the determined commonality. In this first example, the artificial intelligence and/or machine learning may generate differentiation criteria that differentiates an element or object of interest in the point cloud based on a set of data points that do not have more than a specified maximum distance in any one or more of the x, y, and z coordinates between each neighboring pair of data points, that have no less than a specified number of data points within a specified volume of space. As another example, PCS 100 may perform a sample inspection and/or render of the point cloud data points, and may use the artificial intelligence and/or machine learning to detect patterns, shapes, color variations, lighting variations, and/or other variations, and to define or select (at 204) the differentiation criteria based on the detected patterns, shapes, and/or variations. In this second example, PCS 100 may select (at 204) first differentiation criteria for a first point cloud representing an outdoor environment, and may select (at 204) second differentiation criteria for a second point cloud representing an indoor environment. Alternatively, the artificial intelligence and/or machine learning may generate differentiation criteria that differentiates an element or object of interest in the point cloud based on a set of data points that have similar lighting and/or coloring, that are about one or more common planes (e.g., x, y, and z coordinates within a specified range), and/or that are clustered in one or more shapes (e.g., a desk shape, a chair shape, a cup shape, etc.).

Process 200 may include scanning (at 206) the point cloud data points for positional and non-positional data values that match or satisfy the differentiation criteria or that share some commonality that is sufficient to satisfy the differentiation criteria. The scanning (at 206) may include opening the point cloud file, comparing the positional and non-positional data values of each data point to the differentiation criteria, and/or identifying commonality or variances in the values of neighboring or adjacent data points that match or satisfy the differentiation criteria.

Process 200 may include differentiating (at 208) each set of data points with some positional or non-positional commonality that matches or satisfies the same criterion of the differentiation criteria. The differentiation (at 208) may identify elements or objects in the point cloud that are of particular interest, and that should be extracted in order to be accessed, rendered, edited, processed, and/or otherwise interacted with separated from other data points of the point cloud.

In some embodiments, differentiating (at 208) the sets of data points may include tagging or labeling each set of data points with a different identifier. In some embodiments, differentiating (at 208) the set of data points may include extracting or separating out the set of data points from the point cloud into a separate temporary data structure or portion of memory for subsequent tree construction.

Process 200 may include generating (at 210) a tree-based representation for each differentiated set of data points. Generating (at 210) the tree-based representation may include organizing the differentiated set of data points into a binary tree, an octree, a k-d tree, or another tree. In some embodiments, the tree may preserve the positional relationships between the set of data points, the non-positional relationships between the set of data points, and/or the commonality with which the set of data points are differentiated from other point cloud data points. For instance, a parent node in the tree may represent a 3D volume or region, and all child or leaf nodes grouped under that parent node may include or correspond to data points with positional data elements that are within the 3D volume or region of the parent node. Similarly, a parent node in the tree may represent a particular range of colors, and all child or leaf nodes grouped under that parent node may include or correspond to data points with non-positional data elements that specify coloring in the particular range of colors.

Figure 3:
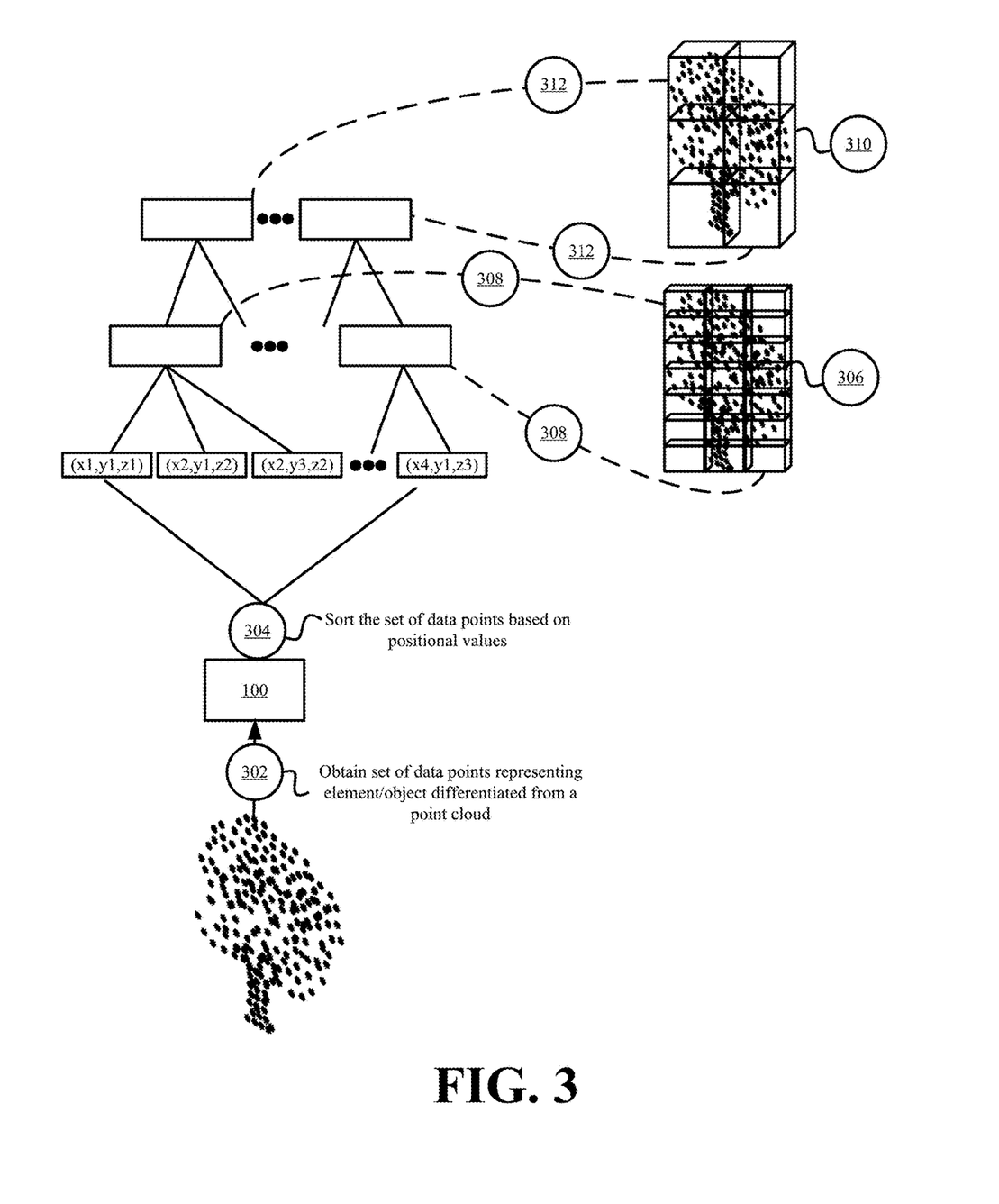
FIG. 3 illustrates a tree construction example for a set of data points that is extracted from a larger point cloud and that represents an element or object differentiated from the larger point cloud in accordance with some embodiments presented herein.

FIG. 3 illustrates a tree construction example for a set of data points that is extracted from a larger point cloud and that represents an element or object differentiated from the larger point cloud in accordance with some embodiments presented herein. As shown in FIG. 3, may obtain (at 302) a set of data points for an object that is differentiated from a point cloud using the differentiation criteria, and may sort (at 304) first set of data points 103 according to the positional values of the data points. The sorted data points may become leaf nodes of the tree.

PCS 100 may add parent nodes for the volume or region of space spanned by two or more leaf nodes of the tree. For instance, PCS 100 may identify coordinates of the data points within first set of data points 103 at the outermost boundaries of the differentiated object, may partition (at 306) the space within the outermost boundaries into cubes or other volumes of a first size, may create (at 308) a parent node for each cube or volume of the first size, and may link a parent node to one or more leaf nodes based on the positional values for the data points of the one or more leaf nodes falling within the region or volume of space represented by the parent node. If a parent node corresponds to an empty region of space (e.g., no data points within the cube or volume represented by the parent node), PCS 100 may cull or remove that parent node from the tree or may insert the parent node as an indicator for a region of empty space.

PCS 100 may continue constructing (at 310 and 312) the tree with higher level of nodes (e.g., grandparent nodes) that represent cubes or other volumes of a size that is larger than the size of the lower-level nodes. PCS 100 may continue until the root node represents the space within the outermost boundaries of the differentiated object.

PCS 100 may attribute non-positional information to a parent node based on the non-positional information from its children nodes. For instance, the RGB values for a parent node may be the average or median of the children node RGB values.

In some embodiments, PCS 100 may generate the root node first, wherein the root node represents the particular region of 3D space spanned by the set of data points for the differentiated object. In constructing a binary tree, PCS 100 may partition the particular region of 3D space into two equal sized cubes or volumes, may define child nodes under the root node for each cube or volume, and may continue subdividing the particular region of 3D space in this manner until the leaf nodes corresponding to the individual data points is reached. In constructing an octree, PCS 100 may partition the particular region of 3D space into eight equal sized cubes volumes, may define child nodes under the root node for each cube or volume, and may continue subdividing the particular region of 3D space in this manner until the leaf nodes corresponding to the individual data points is reached.

To optimize the tree construction and reduce the potential for empty nodes in the tree. PCS 100 may construct a k-d tree and may partition the particular region of 3D space spanned by the set of data points for the differentiated object into two or more equal or unequal sized volumes. The size and/or shape of each volume may be determined by the number of data points, parent nodes, or child nodes that fall within that volume. For instance, PCS 100 may expand the size of a volume when the volume corresponds to empty space or encompasses fewer than one child node or one data point.

Figure 4:
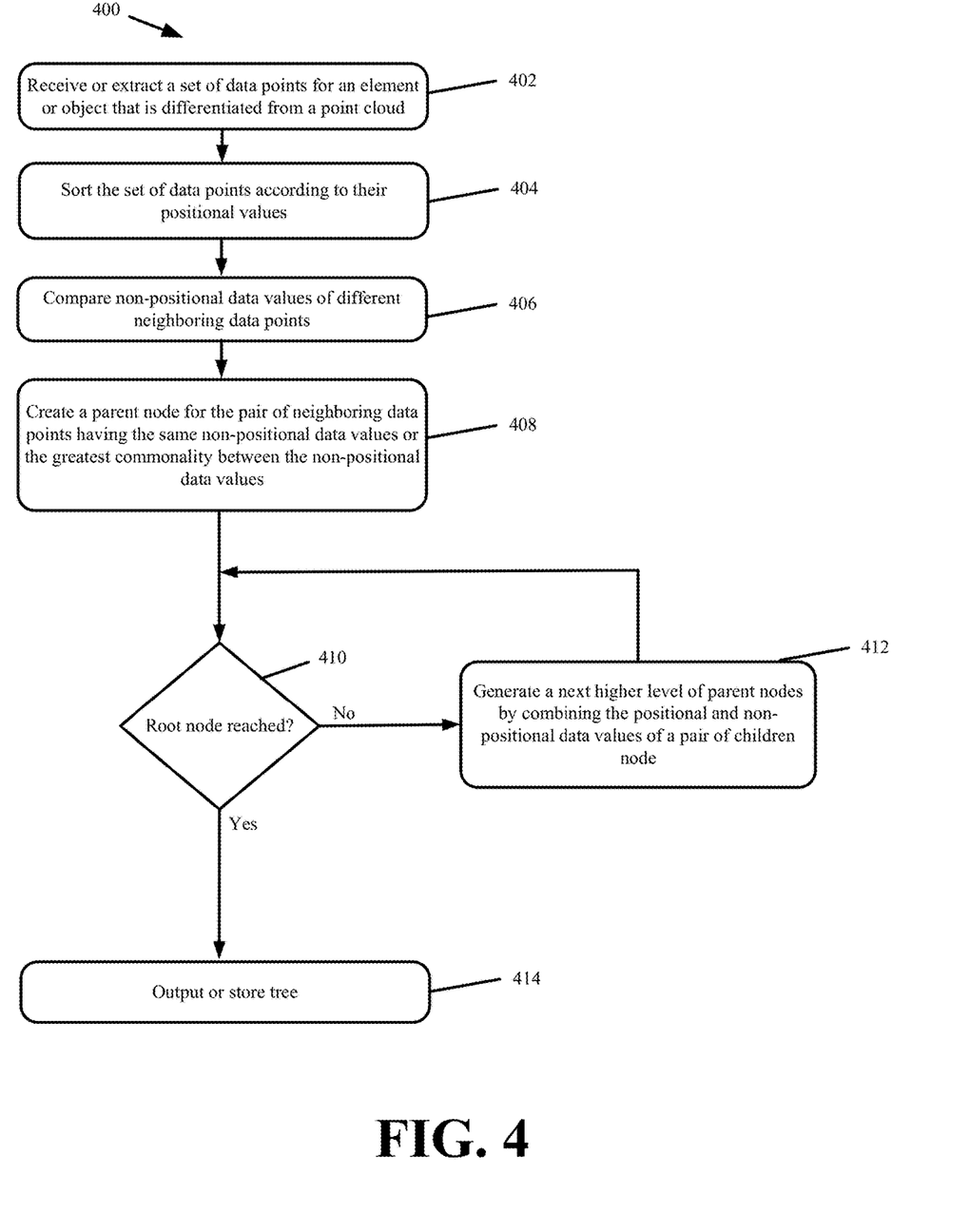
FIG. 4 presents a process for constructing a binary tree based on a scattered set of data points representing an object that is differentiated from a point cloud in accordance with some embodiments presented herein.

In some embodiments, PCS 100 may construct a binary tree for each differentiated object that preserves more detail and/or data point information at each level of the tree. FIG. 4 presents a process 400 for constructing a binary tree based on a scattered set of data points representing an object that is differentiated from a point cloud in accordance with some embodiments presented herein. Process 400 may be implemented by PCS 100.

Process 400 may include receiving or extracting (at 402) a set of data points for an element or object that is differentiated from a point cloud using the differentiation criteria. The set of data points may include several data points with a nonuniform or irregular positioning and different non-positional information (e.g., visual characteristics).

Process 400 may include sorting (at 404) the set of data points according to their positional values. The sorting (at 404) arranges the data points so that neighboring data points in one or more planes may be easily identified.

Process 400 may include comparing (at 406) non-positional data values of different neighboring data points, and creating (at 408) a parent node for the pair of neighboring data points having the same non-positional data values or the greatest commonality between the non-positional data values. In some embodiments, PCS 100 may select one or more non-positional data values that are to be compared. In some other embodiments, PCS 100 may compare all non-positional data values and identify the pair of neighboring data points having the most matching or most similarity in the non-positional data values. For instance, PCS 100 may create a first parent node for a first pair of neighboring data points that have the same RGB color values, and may create a second parent node for a second pair of neighboring data points that do not have matching RGB color values, but that differ by less than 10% in each or all of the RGB color values.

Creating (at 408) the parent node may include defining a single data point with positional values that fall directly in between the pair of neighboring data points represented by that parent node, and defining the non-positional data values of the parent node based on the non-positional data values of the pair of neighboring nodes. Since PCS 100 performed the earlier step of identifying the pair of neighboring nodes with the most commonality in the non-positional data values, the parent nodes created by process 400 more accurately retain the visual characteristics and other non-positional information of the child nodes than other techniques for tree construction that simply select and create a parent node for any data points or children nodes falling a certain region of space.

Process may determine (at 410) if the root node has been reached. In response to determining (at 410—No) that the root node has not been reached, process 400 may include generating (at 412) a next higher level of parent nodes by combining the positional and non-positional data values of a pair of children node. In response to determining (at 410—Yes) that the root node has been reached, process 400 may include outputting or storing (at 414) the constructed tree for efficient accessing, rendering, editing, processing, and/or other interactions with the differentiated object that is represented by the set of data points organized to that tree.

PCS 100 may generate multiple trees for different sets of data points in a point cloud in order to separately access, process, render, manipulate, and/or otherwise interact with each differentiated element or object of the point cloud that is represented by a different tree or a set of data points. PCS 100 may use the multiple trees to serialize and/or parallelize the processing of the point cloud. In other words, rather than loading in all of the point cloud data points at one time and processing the entire set of data points, PCS 100 may selectively load in the one or more trees having the one or more sets of data of points that are the direct subjects or targets of the accessing, processing, rendering, manipulation, and/or other tasks being requested or performed. The selective loading and processing reduces the resource and processing overhead on any device that is used to access or work with the point cloud, and increases the responsiveness of that device by optimizing the memory and processor usage for just the sets of data points that are necessary or required for the current task.

Figure 5:
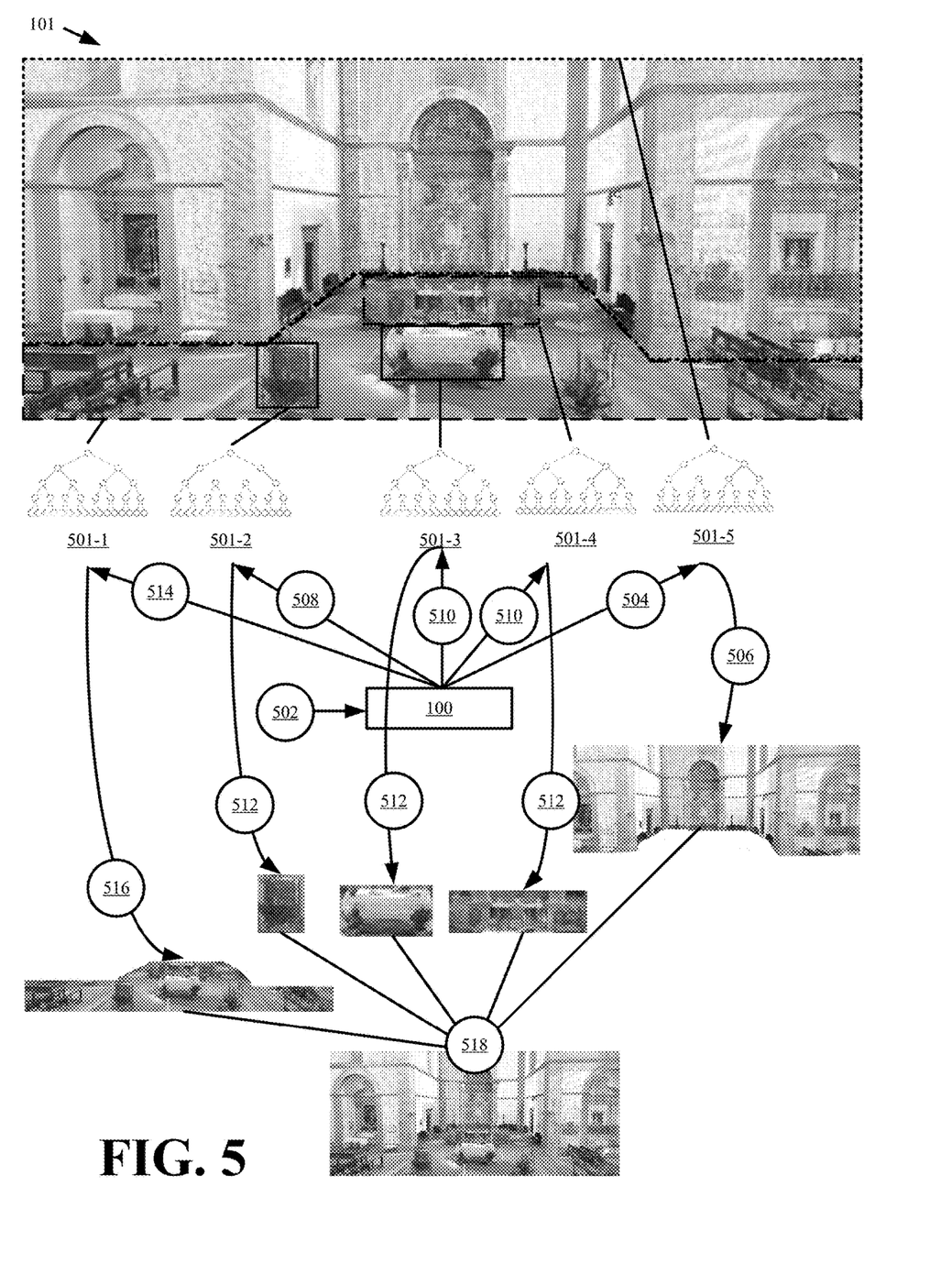
FIG. 5 illustrates an example of optimizing the rendering of a point cloud by serializing and/or parallelizing the rendering based on a partitioning of the point cloud into different trees in accordance with some embodiments presented herein.

FIG. 5 illustrates an example of optimizing the rendering of a point cloud by serializing and/or parallelizing the rendering based on a partitioning of the point cloud into different trees in accordance with some embodiments presented herein. As shown in FIG. 5, PCS 100 may receive point cloud 101, may differentiate 5 different elements or objects from point cloud 101 using differentiation criteria, and may create 5 different trees 501-1, 501-2, 501-3, 501-4, and 501-5 (hereinafter sometimes collectively referred to as "trees 501" or individually as "tree 501") from the different sets of data points that are extracted for each of the differentiated elements or objects from point cloud 101. First tree 501-1 may include a first set of data points that form the floor and foreground of the 3D environment represented by point cloud 101, second tree 501-2 may include a second set of data points for a first object of specific interest that is differentiated from the 3D environment, third tree 501-3 may include a third set of data points for a second object of specific interest that is differentiated from the 3D environment, fourth tree 501-4 may include a fourth set of data points for a third object of specific interest that is differentiated from the 3D environment, and fifth tree 501-5 may include a fifth set of data points for the walls and background of the 3D environment.

PCS 100 may receive (at 502) a request to render point cloud 101. To preserve resources and efficiently process the request, PCS 100 may select and process one or more of the trees at any given time rather than attempt to process and render the entire point cloud with all of its data points together.

In some embodiments, PCS 100 may prioritize the rendering of the trees. For instance, PCS 100 may render the foreground, objects of specific interest, and/or background in a particular order. The ordering may specify rendering the most important objects or elements of the 3D environment before the least important, rendering the objects or elements in the least amount of time based on available resources, rendering from front to back or back to front, rendering low-density or low-resolution elements or objects before rendering the high-density or high-resolution elements or objects, etc. In some embodiments, PCS 100 may look to the size (e.g., the number of leaf nodes or the number of branches) of each tree 501 in order to determine the rendering order.

As shown in FIG. 5, PCS 100 may select (at 504) fifth tree 501-5 to render first because fifth tree 501-5 is a low resolution background that contains the most visual data and therefore provides the most context to the scene. PCS 100 may load the fifth set of data points from fifth tree 501-5 into memory, and may determine memory availability after loading in the fifth set of data points.

The fifth set of data points may consume most of the memory leaving less than a threshold amount of available memory. In response to determining that there is less than the threshold amount of available memory, PCS 100 may serialize the render of point cloud 101 by rendering (at 506) the fifth set of data points before other data points of point cloud 101, and by presenting the rendered result at a first time. The rendering (at 506) may include positioning each data point of the fifth set of data points in 3D space according to their positional values, and presenting each data point at its respective position with visual characteristics defined by the non-positional data values of that data point. More generally, rendering (at 506) the fifth set of data points may include generating an image or visual representation for the one or more elements or objects of the overall 3D environment that are defined by the fifth set of data points.

PCS 100 may retain the rendering result in memory or to disk, and may flush the fifth set of data points from memory in order to free the memory for rendering of the remaining trees 501. PCS 100 may next select (at 508) second tree 501-2 to render because second tree 501-2 represents a specific object of interest from point cloud 101 and is closest in the foreground. PCS 100 may load the second set of data points from second tree 501-2 into memory, and may determine memory availability after loading in the second set of data points.

The second set of data points do not consume much memory, and PCS 100 has more than the threshold amount of available memory left after loading in second tree 501-2. PCS 100 uses the remaining available memory to load (at 510) in the third set of data points from third tree 501-3 and the fourth set of data points from fourth tree 501-4. After loading in second tree 501-2, third tree 501-3, and fourth tree 501-4, PCS 100 may determine that the amount of available memory is less than the threshold amount. Accordingly, PCS 100 may perform (at 512) a parallel rendering for the second, third, and fourth sets of data points that are loaded into memory at the same time.

PCS 100 may once again flush the data points that were loaded into memory, and may select (at 514) first tree 501-1 as the last tree that has yet to be rendered. PCS 100 may load the first set of data points from first tree 501-1 into memory, and may render (at 516) the first set of data points at a third time that is after the first time and the second time.

At this stage, PCS 100 has completed the serialized and parallelized rendering of point cloud 101. Specifically, PCS 100 has a separate render for each of the objects represented by each tree 501. PCS 100 may create (at 518) a composite 3D image of point cloud 101 by combining the images that are rendered from each tree 501 at their respective positions in 3D space. In some embodiments, the composite 3D image may be generated and presented at one time after the rendering for each of the different sets of data points from trees 501 is complete. In some other embodiments, the composite 3D image may be generated via a gradual filling in as the rendering for each set of data points from each tree 501 is complete.

Figure 6:
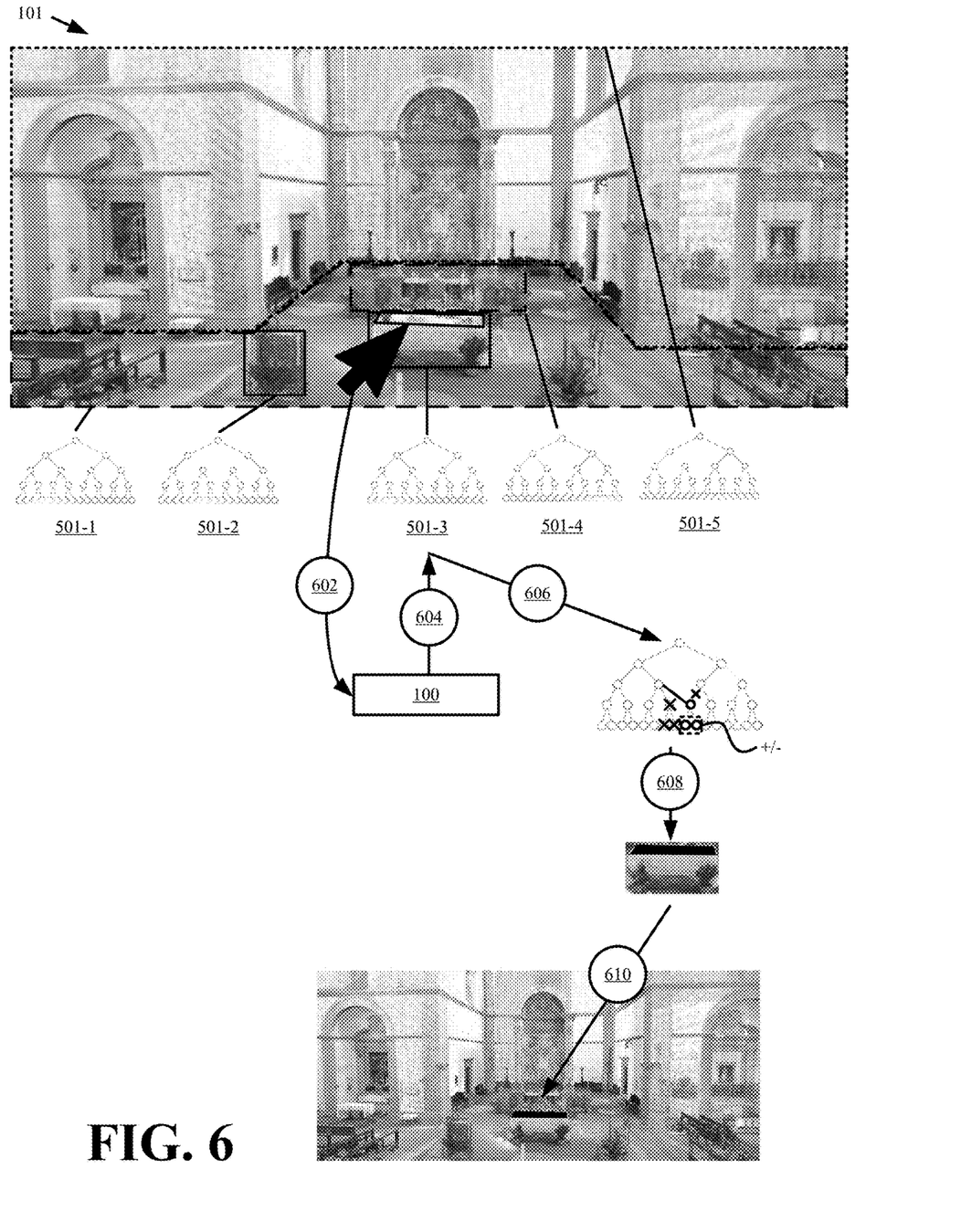
FIG. 6 illustrates an example of optimizing the rendering of a point cloud based on a partitioned representation of the point cloud and selective processing of the partitions in accordance with some embodiments presented herein.

FIG. 6 illustrates an example of optimizing the rendering of a point cloud based on a partitioned representation of the point cloud and selective processing of the partitions in accordance with some embodiments presented herein. PCS 100 may present the composite 3D image of point cloud 101 on a display, and may receive (at 602) user input that modifies a particular part of the composite 3D image or point cloud 101.

PCS 100 may determine the region or the coordinates that correspond to the particular part of point cloud 101 that is impacted by the user input. PCS 100 may select (at 604) third tree 501-3 in response to determining that the third set of data points of third tree 501-3 include data points positioned within the impacted region. In particular, PCS 100 may simply inspect the positional values associated with the root node of each tree 501 in order to determine the coordinates spanned by the underlying leaf nodes or data points in that tree 501. The positional values for the root node of third tree 501-3 will span the particular part of point cloud 101 affected by the user input. PCS 100 may then inspect the positional values for each of the nodes under the root node to traverse third tree 501-3 and to isolate the subset of leaf nodes or data points in the particular part or region of point cloud 101 affected by the user input. Accordingly, PCS 100 may leverage trees 501 and the organization of data points under trees 501 to efficiently locate data points affected by the user input without having to inspect the positional values for all data points or individual data points within the millions or billions of data points forming point cloud 101.

PCS 100 may load the third tree 501-3 with the third set of data points into memory while discarding or omitting all other data points of other trees 501 from memory. In other words, rather than select and load all data points of point cloud 101 in order to process the request affecting the particular part of point cloud 101, PCS 100 may select (at 604) and load just the third set of data points of third tree 501-3 that make up the differentiated object in the affected region.

PCS 100 may modify (at 606) the third set of data points according to the user input. The modifications may include adding or removing data points from third tree 501-3, repositioning one or more data points about third tree 501-3 (e.g., changing the positional values of the one or more data points), and/or changing the non-positional data values of one or more of the third set of data points.

PCS 100 may process the modified third tree 501-3, and may render (at 608) only the third set of data points for the particular object that was affected by the user input. PCS 100 may update (at 610) the composite image by replacing just the image of the particular object with the new image resulting from rendering (at 608) the updated third set of data points from modified third tree 501-3. In other words, PCS 100 is able to apply the user change to point cloud 101 without having to load or process all data points of point cloud 101. By identifying, loading, and processing only the third set of data points represented the particular object that was impacted by the user input, PCS 100 is able to preserve resources and reduce the time to apply the change and update the point cloud visual presentation.

The tree-based representation for each differentiated element or object provides additional benefits beyond the reduction in resources and computational effort needed to access, render, process, manipulate, or interact with point cloud 101. The additional benefits may include efficiently organizing, accessing, and/or manipulating subsets of data points or specific data points of a differentiated element or object, thereby further optimizing the editing, processing, manipulation, and/or other interactions with the differentiated elements and/or objects.

For instance, user input may specify enhancing the brightness to the rightmost side of a particular element or object. PCS 100 may retrieve the tree for the particular element or object, may access the subset of data points that form the rightmost side of the particular element or object via a branch traversal to a parent node for the subset of data points, and may apply the adjustment to the parent node. The changes to the parent node may then be automatically applied or propagated down to the children nodes and the subset of data points under the parent node. In other words, rather than individually identify each data point of the subset of data points and modify each of the identified data points, PCS 100 may find the one or more parent nodes for the subset of data points, and may apply the change to the subset of data points by simply modifying the one or more parent nodes. Finding the parent nodes is a faster operation because PCS 100 may restrict the searching to the one or more trees that cover the region affected by the user input rather than searching within the entire 3D space covered by the cloud. Finding the parent nodes is also a faster operation because each parent node in a searched tree may include two or more of the desired subset of data points, resulting in PCS 100 performing fewer searches and/or identifying fewer nodes than when individually locating each data point of the subset of data points amongst all data points of the point cloud.

Figure 7:
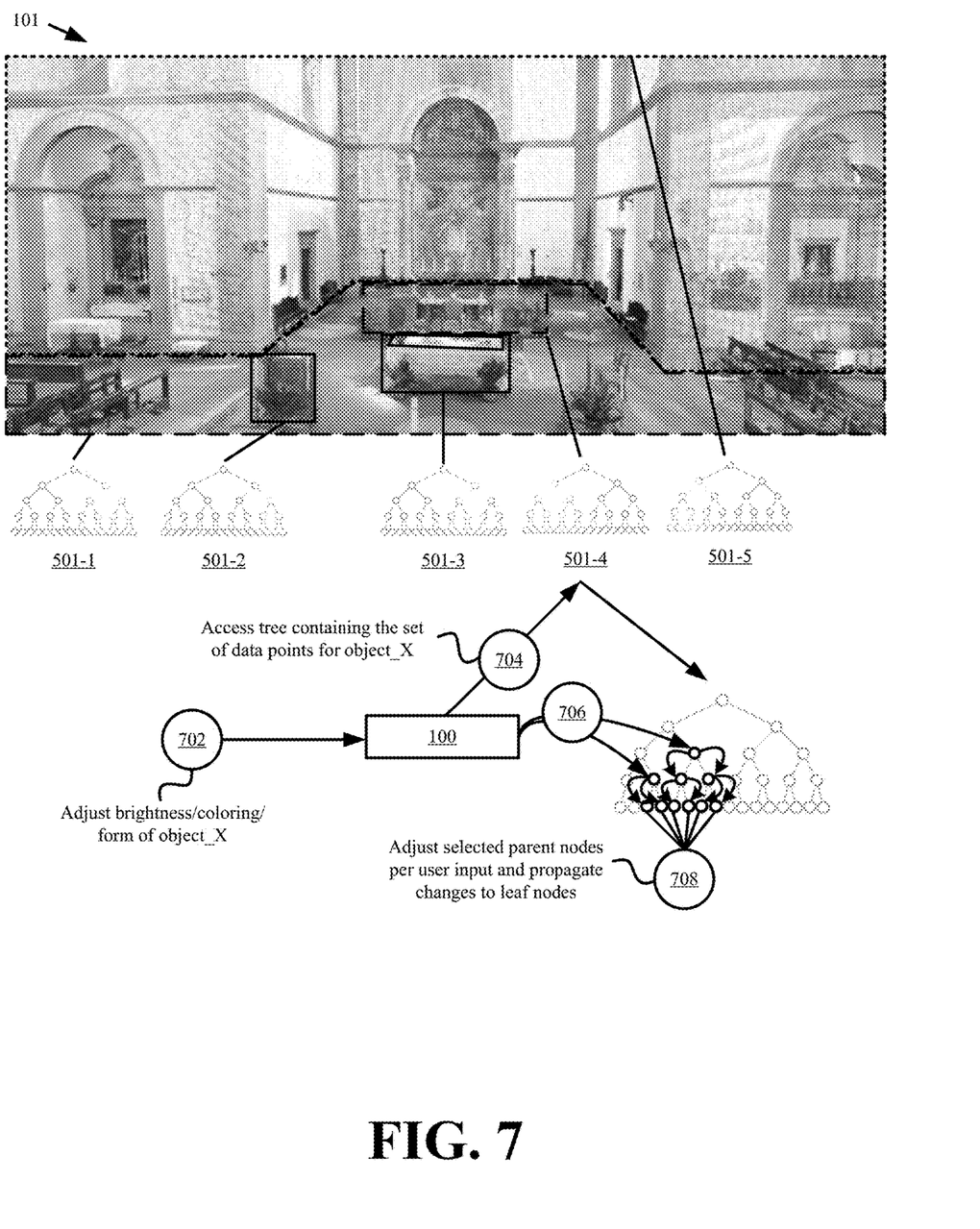
FIG. 7 illustrates an example of using the multi-tree representation of a point cloud to efficient modify part of an object within a 3D environment represented by the point cloud in accordance with some embodiments presented herein

FIG. 7 illustrates an example of using the multi-tree representation of a point cloud to efficient modify part of an object within a 3D environment represented by the point cloud in accordance with some embodiments presented herein. PCS 100 may generate and present a complete render of a 3D environment represented by a point cloud by separately rendering the set of data points from each tree that is generated for the differentiated elements or objects within the 3D environment, and by compositing or otherwise coalescing the render resulting from each tree into a single presentation.

PCS 100 may receive (at 702) user input. PCS 100 may determine that the user input targets a particular element or object of the 3D environment. For instance, the user input may include a mouse click, keyboard key press, function call, or other operation that is performed on or at the position in the single presentation where the particular element or object is rendered, or a position within the 3D environment that includes one or more data points of the particular element or object.

In response to determining that the user input impacts the particular element or object, PCS 100 may access (at 704) fourth tree 501-4 that includes the tree-based representation for the set of data points forming that particular element or object. Accessing (at 704) fourth tree 501-4 may include loading the fourth set of data points from fourth tree 501-4 into memory and/or clearing out other data points from memory if the memory becomes full.

PCS 100 may traverse fourth tree 501-4, may inspect positional and/or non-positional values associated with the nodes, and may select (at 706) one or more parent nodes that have all of their respective children nodes affected by the user input. In other words, rather than inspect each data point of the point cloud or each data point organized under fourth tree 501-4 to determine if that data point is affected by the user input, PCS 100 instead performs a downward traversal from the root node of fourth tree 501-4 to a next child node, and determines if the child node has positional values that fall entirely within the region or space affected by the user input and/or has non-positional values that fall within the attributes and attribute ranges being adjusted. If a node spans a larger region or a region that is outside the region affected by the user input, then PCS 100 may select a next node for analysis. Similarly, if a node includes non-positional values that do not match or differ from the non-positional values affected by the user input, then PCS 100 may select a next node. If, however, the selected node is entirely in the affected region and includes the affected non-positional values, then the user input applies to all children nodes of the selected node. For instance, the user input may specify changing any data points of the particular element or object with (R,G,B) values between (200,15,20) and (250,8,30) to the color black (e.g., (0,0,0)), and PCS 100 may select a parent node having (R,G,B) values between (210,10,20) and (244,13,29) and all children nodes of that parent node without inspecting the values of each of the children nodes separately.

PCS 100 may apply (at 708) the user input to the selected nodes. Applying (at 708) the user input to the selected nodes may be more efficient than selecting and applying the user input to each data point of the affected particular subset of data points individually or one-by-one. For instance, PCS 100 may implement the changes specified in the user input to the two selected parent nodes. The changes may include adjusting one or more of the positional and/or non-positional values of the selected nodes. PCS 100 may automatically propagate and/or apply the adjustments to each of the leaf nodes under the two selected parent nodes without having to individually consider and/or evaluate whether the user input applies to each of the leaf nodes and/or the particular subset of data points represented by the leaf nodes of the selected parent nodes.

As an example, the user input may specify shifting the particular region affected by the user input to the right by 3 coordinates and increasing the red color value for the particular subset of data points in the particular region by a value of 5. PCS 100 may locate the two parent nodes in fourth tree 501-4 that encompass the particular region as a result of all leaf nodes under the two parent nodes falling within the particular region. PCS 100 may then add a value of 3 to the x-positional data value of the parent nodes to shift the particular region to the right by 3 coordinates, and may add a value of 5 to the red color data value of the parent nodes. The adjustments to these data values of the two parent nodes may be automatically inherited by or passed down to each of the leaf nodes or each data point of the particular subset of data points in the affected region. In other words, PCS 100 may locate and apply the user input to the two parent nodes in order to effectuate the changes across the particular subset of data points within the particular region, rather than individually locate each data point of the particular subset of data points that is within the particular region and apply the changes to each data point separately.

In some embodiments, the user input may be applied (at 708) to the two parent nodes without directly changing the values of the leaf nodes under the two parent nodes. When fourth tree 501-4 is selected for rendering, PCS 100 may render each of the leaf nodes based on the original values stored with each leaf node and based on any adjustments to those values that are stored specified in one or more parent nodes of those leaf nodes.

In some other embodiments, the user input may be applied (at 708) to the two parent nodes, and PCS 100 then continues the tree traversal to apply (at 708) the user input to any child and/or leaf nodes under the two parent nodes without having to consider the positioning of the data points represented by those nodes.

PCS 100 may generate an updated composite visualization of the entire point cloud that incorporates the user input by rendering the fourth set of data points after the modifications applied to the two parent nodes in fourth tree 501-4 are applied to the each of the leaf nodes under the two parent nodes, and by incorporating the newly rendered element or object within the composite visualization without rendering or updating other elements or objects represented in different trees or different sets of data points that were not affected by the user input. As such, PCS 100 may preserve compute, memory, and/or other resources by updating affected parts of a point cloud without having to render the entire point cloud anew.

Figure 8:
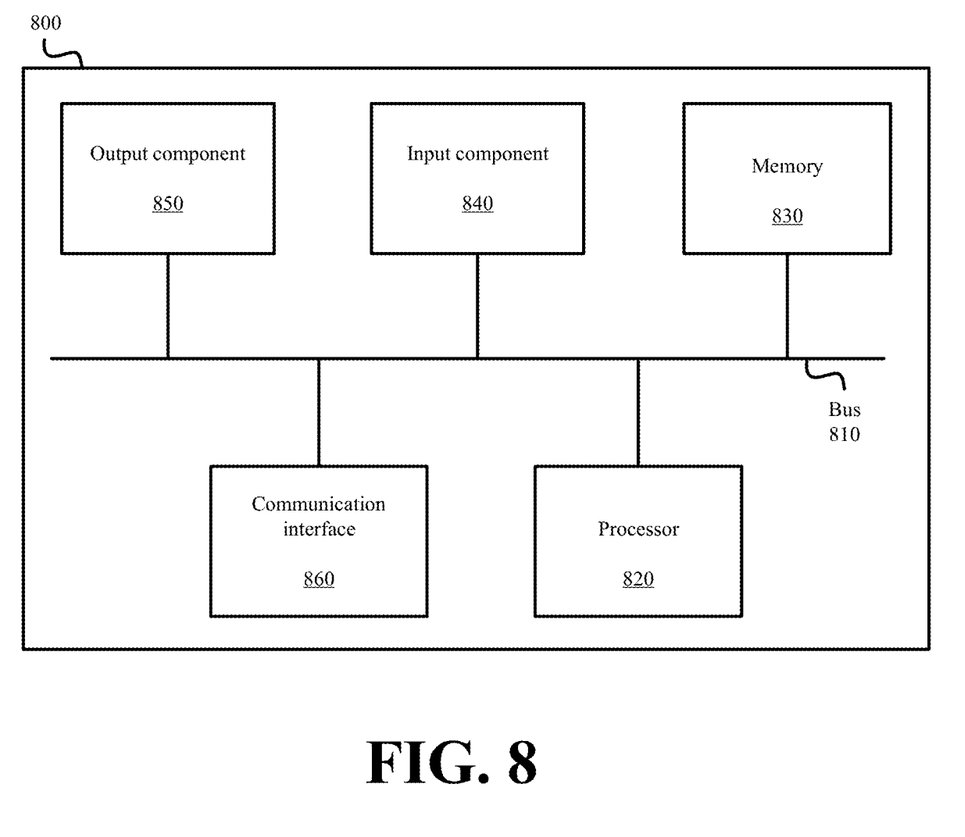
FIG. 8 illustrates example components of one or more devices, according to one or more embodiments described herein.

FIG. 8 is a diagram of example components of device 800. Device 800 may be used to implement one or more of the devices or systems described above (e.g., PCS 100, point cloud imaging devices, point cloud rendering devices, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   partitioning a point cloud into a plurality of trees, wherein the point cloud comprises a plurality of data points that are distributed non-uniformly in three-dimensional ("3D") space to represent a 3D environment, and wherein each tree of the plurality of trees comprises a different set of the plurality of data points that represent a different feature or region of the 3D environment;
   generating a composite image of the 3D environment from rendering the different feature or region of the 3D environment represented by the set of data points from each tree of the plurality of trees;
   detecting user input that modifies a particular feature or region of the 3D environment;

determining that a particular tree of the plurality of trees comprises one or more data points that represent the particular feature or region;

adjusting the one or more data points of the particular tree based on the user input;

generating an updated visualization for the particular feature or region from rendering the particular tree after adjusting the one or more data points of the particular tree; and updating a part of the composite image by replacing a previous visualization for the particular feature or region with the updated visualization without adjusting visualizations for other features or regions of the composite image.

2. The method of claim 1, wherein the particular tree comprises a root node and a plurality of leaf nodes with each leaf node comprising positional values defining a position in the 3D space for a different data point of the particular tree, and wherein the root node comprises positional values for a region of the 3D space encompassed by the set of data points of the particular tree.

3. The method of claim 2, wherein said determining comprises:

selecting the particular tree from the plurality of trees based on the positional values of the root node encompassing the particular feature or region; and selecting the one or more data points for adjustment based on the positional values of one or more leaf nodes being within a 3D position of the particular feature or region.

4. The method of claim 1, wherein generating the composite image comprises:

generating a plurality of images from separately rendering each tree of the plurality of trees, wherein each image of the plurality of images provides a visualization for a different feature or region of the 3D environment; and combining the plurality of images to form the composite image of the 3D environment.

5. The method of claim 4, wherein updating the part of the composite image comprises:

loading the particular tree into memory;

generating an updated image from the set of data points of the particular tree after said adjusting of the one or more data points; and replacing a particular image of the plurality of images used to form the composite image with the updated image.

6. The method of claim 1 further comprising:

inspecting a root node of each tree of the plurality of trees; and determining that the particular tree is impacted by the user input in response to the root node of the particular tree comprising positional values that encompass the particular feature or region and the root node of other trees comprising positional values that do not encompass the particular feature or region.

7. The method of claim 1, wherein partitioning the point cloud comprises:

determining a particular set of data points from the plurality of data points that represent the particular feature or region;

sorting the particular set of data points according to positional values of each data point in the particular set of data points; and defining the particular tree with leaf nodes ordered according to the sorting of the particular set of data points.

8. The method of claim 7, wherein defining the particular tree comprises:

defining a parent node for a group of two or more leaf nodes, wherein defining the parent node comprises assigning one or more positional and non-positional values to the parent node that are derived from corresponding positional and non-positional values of each leaf node in the group of two or more leaf nodes.

9. The method of claim 1 further comprising:

detecting commonality in one or more positional values and non-positional values of different sets of the plurality of data points; and differentiating between a plurality of different features or regions of the 3D environment based on the commonality in the different sets of data points.

10. The method of claim 9, wherein detecting the commonality comprises:

determining a first set of the plurality of data points that are within a specified distance from one another and that are in a foreground of the 3D environment, and a second set of the plurality of data points that are within the specified distance from one another and that are in a background of the 3D environment.

11. The method of claim 1 further comprising:

defining the particular tree with a root node that represents 3D space encompassed by the particular feature or region;

defining the particular tree with a child node under the root node that represents part of the 3D space encompassed by the particular feature or region; and defining the particular tree with a leaf node one or more layers under the child node, wherein the leaf node represents a discrete point within the part of the 3D space represented by the child node.

12. The method of claim 1 further comprising:

mapping a position at which the user input is issued to positional values of the one or more data points from the particular tree.

13. The method of claim 1, wherein generating the composite image comprises:

loading one or more of the plurality of trees into memory at different times;

generating one or more images at each of the different times based on the set of data points from the one or more trees that are loaded into the memory at the different times; and combining the one or more images that are generated at each of the different times to produce the composite image.

14. The method of claim 1, wherein the user input is first user input issued at a first time, the method further comprising:

detecting, at a second time, second user input that modifies a second feature or region of the 3D environment that is different than the particular feature or region;

determining that a second tree of the plurality of trees comprises one or more data points that represent the second feature or region, wherein the second tree is different than the particular tree;

removing the set of data points of the particular tree from memory;

loading the set of data points of the second tree into the memory; and processing the set of data points of the second tree in order to update a different part of the composite image.

15. A system comprising:
one or more processors configured to:
partition a point cloud into a plurality of trees, wherein the point cloud comprises a plurality of data points that are distributed non-uniformly in three-dimensional ("3D") space to represent a 3D environment, and wherein each tree of the plurality of trees comprises a different set of the plurality of data points that represent a different feature or region of the 3D environment;
generate a composite image of the 3D environment from rendering the different feature or region of the 3D environment represented by the set of data points from each tree of the plurality of trees;
detect user input that modifies a particular feature or region of the 3D environment;
determine that a particular tree of the plurality of trees comprises one or more data points that represent the particular feature or region;
adjust the one or more data points of the particular tree based on the user input;
generate an updated visualization for the particular feature or region from rendering the particular tree after adjusting the one or more data points of the particular tree; and
update a part of the composite image by replacing a previous visualization for the particular feature or region with the updated visualization without adjusting visualizations for other features or regions of the composite image.

16. The system of claim 15, wherein generating the composite image comprises:
generating a plurality of images from separately rendering each tree of the plurality of trees, wherein each image of the plurality of images provides a visualization for a different feature or region of the 3D environment; and
combining the plurality of images to form the composite image of the 3D environment.

17. The system of claim 16, wherein updating the part of the composite image comprises:
loading the particular tree into memory;
generating an updated image from the set of data points of the particular tree after said adjusting of the one or more data points; and
replacing a particular image of the plurality of images used to form the composite image with the updated image.

18. The system of claim 15, wherein the one or more processors are further configured to:
inspect a root node of each tree of the plurality of trees; and
determine that the particular tree is impacted by the user input in response to the root node of the particular tree comprising positional values that encompass the particular feature or region and the root node of other trees comprising positional values that do not encompass the particular feature or region.

19. The system of claim 15, wherein partitioning the point cloud comprises:
determining a particular set of data points from the plurality of data points that represent the particular feature or region;
sorting the particular set of data points according to positional values of each data point in the particular set of data points; and
defining the particular tree with leaf nodes ordered according to the sorting of the particular set of data points.

20. A non-transitory computer-readable medium, storing a plurality of processor-executable instructions to:
partition a point cloud into a plurality of trees, wherein the point cloud comprises a plurality of data points that are distributed non-uniformly in three-dimensional ("3D") space to represent a 3D environment, and wherein each tree of the plurality of trees comprises a different set of the plurality of data points that represent a different feature or region of the 3D environment;
generate a composite image of the 3D environment from rendering the different feature or region of the 3D environment represented by the set of data points from each tree of the plurality of trees;
detect user input that modifies a particular feature or region of the 3D environment;
determine that a particular tree of the plurality of trees comprises one or more data points that represent the particular feature or region;
adjust the one or more data points of the particular tree based on the user input;
generate an updated visualization for the particular feature or region from rendering the particular tree after adjusting the one or more data points of the particular tree; and
update a part of the composite image by replacing a previous visualization for the particular feature or region with the updated visualization without adjusting visualizations for other features or regions of the composite image.

* * * * *